US012793661B2

United States Patent

(12) United States Patent
Kitamura

(10) Patent No.: US 12,793,661 B2
(45) Date of Patent: Nov. 10, 2026

(54) DISPLAY SYSTEM, IMAGE PROCESSING APPARATUS, AND IMAGE PROCESSING METHOD

(71) Applicant: ALPS ALPINE CO., LTD., Tokyo (JP)

(72) Inventor: Kazuhiro Kitamura, Fukushima (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 19/411,976

(22) Filed: Dec. 8, 2025

(65) Prior Publication Data

US 2026/0221111 A1 Jul. 30, 2026

(30) Foreign Application Priority Data

Jan. 29, 2025 (JP) ................................ 2025-013068

(51) Int. Cl.
*G09G 3/34* (2006.01)

(52) U.S. Cl.
CPC ... *G09G 3/3406* (2013.01); *G09G 2320/0646* (2013.01); *G09G 2340/00* (2013.01)

(58) Field of Classification Search
None
See application file for complete search history.

(56) References Cited

U.S. PATENT DOCUMENTS

2002/0054440 A1 5/2002 Akamine et al.

FOREIGN PATENT DOCUMENTS

JP 2001-331132 11/2001

*Primary Examiner* — Aneeta Yodichkas
(74) *Attorney, Agent, or Firm* — IPUSA, PLLC

(57) ABSTRACT

A display system includes a patterned covering surface having a plurality of holes; a display device having a display surface covered by the covering surface; and an image processing apparatus configured to process image data displayed on the display device. The image processing apparatus includes a correction data storage to store correction data generated by gradation-inverting a luminance distribution that appears on the covering surface when the entire display surface of the display device is displayed in a uniform color; and an image processor to correct the image data to be displayed on the display surface based on the correction data that is read from the correction data storage within a luminance dynamic range that is determined based on a transmittance of the covering surface and an image luminance of the image data.

12 Claims, 11 Drawing Sheets

FIG.6B (a) IMAGE LUMINANCE OF ORIGINAL IMAGE DATA

| | | | | | | | | | |
|---|---|---|---|---|---|---|---|---|---|
| 10% | 10% | 30% | 30% | 50% | 50% | 70% | 70% | 90% | 90% |

(b) TRANSMITTANCE OF INSTRUMENT PANEL 3

| | | | | | | | | | |
|---|---|---|---|---|---|---|---|---|---|
| 70% | 60% | 50% | 70% | 40% | 60% | 60% | 70% | 80% | 90% |

(c) ATTENUATED LUMINANCE (= a × b)

| | | | | | | | | | |
|---|---|---|---|---|---|---|---|---|---|
| 7% | 6% | 15% | 21% | 20% | 30% | 42% | 49% | 72% | 81% |

(d) ATTENUATED LUMINANCE TO 100% IMAGE LUMINANCE

| | | | | | | | | | |
|---|---|---|---|---|---|---|---|---|---|
| 70% | 60% | 50% | 70% | 40% | 60% | 60% | 70% | 80% | 90% |

(e) BOTTLENECK DETERMINATION

| | | | | | | | | | |
|---|---|---|---|---|---|---|---|---|---|
| – | – | – | – | BN | – | BN | – | BN | – |

(f) DETERMINATION PERCENTAGE (= b × 100/a)

| | | | | | | | | | |
|---|---|---|---|---|---|---|---|---|---|
| | | | | 80.0% | | 85.7% | | 88.9% | |

↓

LUMINANCE DYNAMIC RANGE

FIG.7

(a) IMAGE LUMINANCE OF ORIGINAL IMAGE DATA

| | | | | | | |
|---|---|---|---|---|---|---|
| 150 | 120 | 80 | 120 | 100 | 60 | 220 |

(b) TRANSMITTANCE OF INSTRUMENT PANEL 3

| | | | | | | |
|---|---|---|---|---|---|---|
| 80% | 70% | 50% | 40% | 50% | 60% | 80% |

(c) ATTENUATED LUMINANCE (= a × b)

| | | | | | | |
|---|---|---|---|---|---|---|
| 120 | 84 | 40 | 48 | 50 | 36 | 176 |

(d) ORIGINAL IMAGE REPRODUCTION GAIN (= a/c)

| | | | | | | |
|---|---|---|---|---|---|---|
| 1.25 | 1.43 | 2.00 | 2.50 | 2.00 | 1.67 | 1.25 |

(e) IMAGE LUMINANCE × ORIGINAL IMAGE REPRODUCTION GAIN

| | | | | | | |
|---|---|---|---|---|---|---|
| 188 | 171 | 160 | 300 | 200 | 100 | 275 |

(f) GAIN SUPPRESSION COEFFICIENT (= e/255)

| | | | | | | |
|---|---|---|---|---|---|---|
| — | — | — | 1.18 | — | — | — |

(g) ADJUSTMENT GAIN (= d/f)

| | | | | | | |
|---|---|---|---|---|---|---|
| — | — | — | 2.13 | — | — | — |

(h) DETERMINATION PERCENTAGE (= b × g)

| | | | | | | |
|---|---|---|---|---|---|---|
| — | — | — | 85.0% | — | — | — |

↓

LUMINANCE DYNAMIC RANGE

FIG.8

(a) IMAGE LUMINANCE OF ORIGINAL IMAGE DATA

| | | | | | | |
|---|---|---|---|---|---|---|
| 150 | 120 | 80 | 120 | 100 | 60 | 220 |

(b) TRANSMITTANCE OF INSTRUMENT PANEL 3

| | | | | | | |
|---|---|---|---|---|---|---|
| 80% | 70% | 50% | 40% | 50% | 60% | 80% |

(c) ATTENUATED LUMINANCE (= a × b)

| | | | | | | |
|---|---|---|---|---|---|---|
| 120 | 84 | 40 | 48 | 50 | 36 | 176 |

(d) ORIGINAL IMAGE REPRODUCTION GAIN (= a/c)

| | | | | | | |
|---|---|---|---|---|---|---|
| 1.25 | 1.43 | 2.00 | 2.50 | 2.00 | 1.67 | 1.25 |

(e) IMAGE LUMINANCE × ORIGINAL IMAGE REPRODUCTION GAIN

| | | | | | | |
|---|---|---|---|---|---|---|
| 188 | 171 | 160 | 300 | 200 | 100 | 275 |

(f) GAIN SUPPRESSION COEFFICIENT (= e/255)

| | | | | | | |
|---|---|---|---|---|---|---|
| — | — | — | 1.18 | — | — | — |

(h) DETERMINATION PERCENTAGE (= 1/f)

| | | | | | | |
|---|---|---|---|---|---|---|
| — | — | — | 85.0% | — | — | — |

↓

LUMINANCE DYNAMIC RANGE

FIG.9

(a) IMAGE LUMINANCE OF ORIGINAL IMAGE DATA

| | | | | | | |
|---|---|---|---|---|---|---|
| 150 | 120 | 80 | 120 | 100 | 60 | 220 |

(b) TRANSMITTANCE OF INSTRUMENT PANEL 3

| | | | | | | |
|---|---|---|---|---|---|---|
| 80% | 70% | 50% | 40% | 50% | 60% | 80% |

(g') ADJUSTMENT GAIN (= 255/a)

| | | | | | | |
|---|---|---|---|---|---|---|
| 1.70 | 2.13 | 3.19 | 2.13 | 2.55 | 4.25 | 1.16 |

(h') DETERMINATION PERCENTAGE (= b × g')

| | | | | | | |
|---|---|---|---|---|---|---|
| 136.0% | 148.8% | 159.4% | 85.0% | 127.5% | 255.0% | 92.7% |

↓

LUMINANCE DYNAMIC RANGE

FIG.10A (a) IMAGE LUMINANCE OF ORIGINAL IMAGE DATA

| | | | | | | |
|---|---|---|---|---|---|---|
| 150 | 120 | 80 | 210 | 100 | 60 | 220 |

(b) TRANSMITTANCE OF INSTRUMENT PANEL 3

| | | | | | | |
|---|---|---|---|---|---|---|
| 80% | 70% | 50% | 40% | 50% | 60% | 80% |

(c) ATTENUATED LUMINANCE (= a × b)

| | | | | | | |
|---|---|---|---|---|---|---|
| 120 | 84 | 40 | 84 | 50 | 36 | 176 |

(d) ORIGINAL IMAGE REPRODUCTION GAIN (= a/c)

| | | | | | | |
|---|---|---|---|---|---|---|
| 1.25 | 1.43 | 2.00 | 2.50 | 2.00 | 1.67 | 1.25 |

(e) IMAGE LUMINANCE × ORIGINAL IMAGE REPRODUCTION GAIN

| | | | | | | |
|---|---|---|---|---|---|---|
| 188 | 171 | 160 | 525 | 200 | 100 | 275 |

(f) GAIN SUPPRESSION COEFFICIENT (= e/255)

| | | | | | | |
|---|---|---|---|---|---|---|
| — | — | — | 2.06 | — | — | — |

(g) ADJUSTMENT GAIN (= d/f)

| | | | | | | |
|---|---|---|---|---|---|---|
| — | — | — | 1.21 | — | — | — |

(h) DETERMINATION PERCENTAGE (= b × g)

| | | | | | | |
|---|---|---|---|---|---|---|
| — | — | — | 48.6% | — | — | — |

↓

LUMINANCE DYNAMIC RANGE

FIG.10B (a) IMAGE LUMINANCE OF ORIGINAL IMAGE DATA

| | | | | | | |
|---|---|---|---|---|---|---|
| 150 | 120 | 80 | 210 | 100 | 60 | 220 |

(b) TRANSMITTANCE OF INSTRUMENT PANEL 3

| | | | | | | |
|---|---|---|---|---|---|---|
| 80% | 70% | 50% | 40% | 50% | 60% | 80% |

(c) ATTENUATED LUMINANCE (= a × b)

| | | | | | | |
|---|---|---|---|---|---|---|
| 120 | 84 | 40 | 84 | 50 | 36 | 176 |

(d) ORIGINAL IMAGE REPRODUCTION GAIN (= a/c)

| | | | | | | |
|---|---|---|---|---|---|---|
| 1.25 | 1.43 | 2.00 | 2.50 | 2.00 | 1.67 | 1.25 |

(e) IMAGE LUMINANCE × ORIGINAL IMAGE REPRODUCTION GAIN

| | | | | | | |
|---|---|---|---|---|---|---|
| 188 | 171 | 160 | 525 | 200 | 100 | 275 |

(f) GAIN SUPPRESSION COEFFICIENT (= e/255)

| | | | | | | |
|---|---|---|---|---|---|---|
| — | — | — | 1.70 | — | — | — |

(g) ADJUSTMENT GAIN (= d/f)

| | | | | | | |
|---|---|---|---|---|---|---|
| — | — | — | 1.47 | — | — | — |

(h) DETERMINATION PERCENTAGE (= b × g)

| | | | | | | |
|---|---|---|---|---|---|---|
| — | — | — | 58.9% | — | — | — |

↓

LUMINANCE DYNAMIC RANGE

DISPLAY SYSTEM, IMAGE PROCESSING APPARATUS, AND IMAGE PROCESSING METHOD

CROSS-REFERENCE TO RELATED APPLICATIONS

This application claims priority to Japanese Patent Application No. 2025-013068, filed Jan. 29, 2025, the entire content of which is incorporated herein by reference.

BACKGROUND

1. Technical Field

The present disclosure relates to a display system, an image processing apparatus, and an image processing method.

2. Description of Related Art

Conventionally, techniques have been known that provide necessary visual information via a display when in use, while making the display appear invisible or absent when not in use (for example, see Japanese Unexamined Patent Application Publication No. 2001-331132, hereinafter "Patent Document 1"). The on-vehicle display device disclosed in Patent Document 1 is integrated into a wood-grain panel of a vehicle's instrument panel, and the front surface of the display, which emits display light when illuminated, is covered with a screen featuring a wood-grain pattern and numerous fine holes that allow the display light to pass through. With this design, the display becomes visible through the fine holes in the screen when it is illuminated, while the wood-grain patterned screen conceals the display when it is off, allowing the entire instrument panel, including the section integrated with the display, to maintain a unified wood-grain appearance.

In recent years, techniques that displayed images on a screen only when necessary have come to be known as "Shytech". This technology has attracted attention for enabling displays to be integrated into interior components with patterns such as a wood-grain pattern or a fabric-like pattern, making the screen blend seamlessly with the surrounding design when not in use. However, because the interior component where Shytech is implemented is not optimized as a dedicated display area, the image shown on the screen can sometimes overlap with the interior pattern, making the displayed image difficult to see.

SUMMARY

According to one aspect of the present disclosure, a display system includes a patterned covering surface having a plurality of holes; a display device having a display surface covered by the covering surface; and an image processing apparatus configured to process image data to be displayed on the display device. The image processing apparatus includes a correction data storage configured to store correction data generated by gradation-inverting data of a luminance distribution that appears on the covering surface when an entirety of the display surface of the display device is displayed in a uniform color; and an image processor configured to correct the image data to be displayed on the display surface based on the correction data that is read from the correction data storage within a luminance dynamic range that is determined based on a transmittance of the covering surface and an image luminance of the image data, the image luminance being a luminance of the image data. The image processor is configured to determine, as the luminance dynamic range, a maximum luminance range in which an attenuated luminance is adjusted to a maximum luminance by luminance adjustment without exceeding an original image luminance, the attenuated luminance being a luminance attenuated from the image luminance according to the transmittance by transmission of display light from the display surface based on the image data through the covering surface.

BRIEF DESCRIPTION OF THE DRAWINGS

FIG. 6B is a diagram for explaining the example of the method of determining a luminance dynamic range by the image processor according to the present embodiment;

FIG. 7 is a diagram illustrating another example of numerical calculation according to the method of determining a luminance dynamic range according to the present embodiment;

FIG. 8 is a diagram illustrating another example of numerical calculation according to the method of determining the luminance dynamic range according to the present embodiment;

FIG. 9 is a diagram illustrating yet another example of numerical calculation according to the method of determining the luminance dynamic range according to the present embodiment;

FIG. 10A is a diagram illustrating yet another example of numerical calculation according to the method of determining the luminance dynamic range according to the present embodiment; and FIG. 10B is a diagram illustrating yet another example of numerical calculation according to the method of determining the luminance dynamic range according to the present embodiment.

DETAILED DESCRIPTION

In a display system in which a display surface is covered with a patterned covering surface having numerous fine holes, an object of the present disclosure is to reduce a problem that a displayed image of the display surface seen through the fine holes overlaps with a pattern of the covering surface, making the displayed image difficult to see.

In order to solve the problem, according to the present disclosure, in an image processing apparatus provided in a display system in which the display surface of a display device is covered with a patterned covering surface having numerous fine holes, image data to be displayed on the display surface is corrected by correction data within a luminance dynamic range determined based on a transmittance of the covering surface and an image luminance (which is equivalent to a luminance of the image data) using correction data, which is generated by inverting data of a luminance distribution that appears on the covering surface when the entire display surface is displayed in a uniform color. Herein, the luminance dynamic range is determined as the maximum luminance range within which an attenuated luminance, which is caused by the display light passing through the covering surface and being reduced according to the transmittance relative to the original image luminance, is adjusted to a maximum luminance without exceeding the original image luminance through luminance adjustment.

According to the present disclosure configured as described above, the image data to be displayed on the display surface is subjected to correction equivalent to visually neutralizing the pattern on the covering surface by an image of the pattern in the correction data obtained by gradation inversion. As a result, it is possible to reduce the problem that the displayed image on the display surface visible through the fine holes overlaps with the pattern on the covering surface, making it difficult to see the displayed image. Instead of performing the correction within the luminance dynamic range adjusted relative to the minimum value of the transmittance of each patterned area on the covering surface, the correction can be performed within a luminance dynamic range that is determined in such a manner that the attenuation amount of luminance caused by the display light passing through the covering surface is minimized within this range. It is thereby possible to suppress the reduction in luminance caused by the correction.

Figure 1:
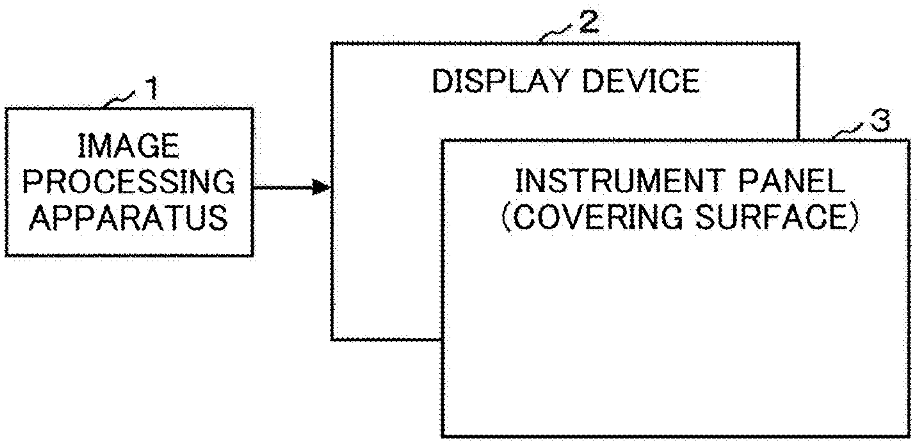
FIG. 1 is a diagram schematically illustrating a configuration example of a display system according to a present embodiment.

Hereinafter, an embodiment of the present disclosure will be described with reference to the drawings. FIG. 1 is a diagram schematically illustrating a configuration example of a display system according to the present embodiment. In the present embodiment, a configuration when a display system is applied to a vehicle is described as an example. As illustrated in FIG. 1, the display system of the present embodiment includes an image processing apparatus 1, a display device 2, and an instrument panel 3.

The image processing apparatus 1 processes image data to be displayed on a display surface of the display device 2, and supplies the processed image data to the display device 2. For example, the image processing apparatus 1 receives image data generated in an on-vehicle device (not illustrated), corrects the input image data based on correction data, and supplies the corrected image data to the display device 2. Alternatively, the image processing apparatus 1 may store an application program for image generation, correct the image data generated by executing the application program based on correction data, and supply the corrected image data to the display device 2.

The display device 2 is, for example, a liquid crystal display, an organic EL display, or an LED display, and includes a light source, a driver, and a display surface. The display device 2 receives the image data from the image processing apparatus 1, controls the light source and the driver based on the image data, and displays an image based on the image data on the display surface. The display surface includes a display panel.

The instrument panel 3 corresponds to a covering surface in the claims, and the display device 2 is installed on the back side of the instrument panel 3 (inside a dashboard or console where the instrument panel 3 is installed), and the front surface of the display surface of the display device 2 is covered by the instrument panel 3. The display surface of the display device 2 and the instrument panel 3 need not be the same size, and the entire display surface may be covered by the instrument panel 3.

The instrument panel 3 has a freely chosen pattern, such as a wood-grain pattern or a fabric-look pattern. The instrument panel 3 has numerous fine holes that can transmit display light based on image data that is output through the display surface. When the light source of the display device 2 is turned on, the display light on the display surface passes forward through the fine holes of the instrument panel 3, so that the displayed image on the display surface can be seen through the instrument panel 3. On the other hand, when the light source is turned off, no image can be seen on the instrument panel 3, and the entire instrument panel 3 is seen in a pattern such as a wood-grain pattern.

Figure 2:
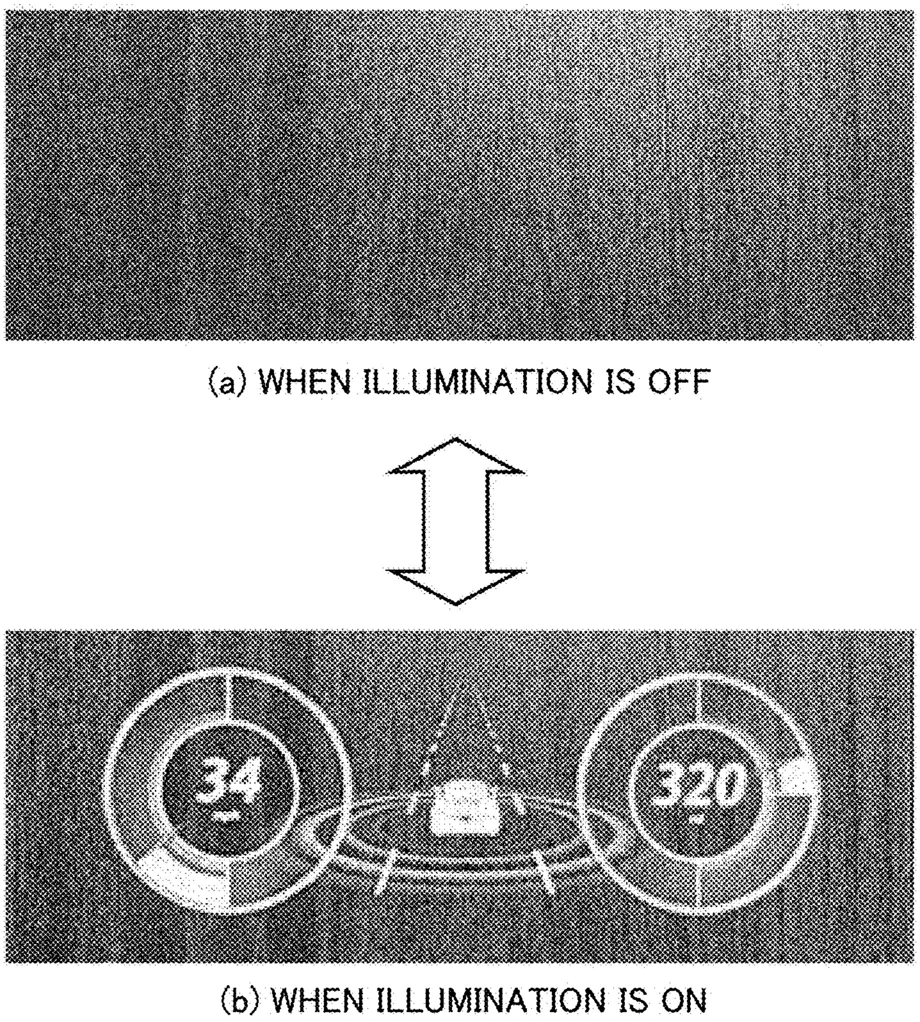
FIG. 2 is a front view illustrating a state in which an instrument panel is viewed from its front.

FIG. 2 illustrates the instrument panel 3 viewed from its front; specifically, the part (a) illustrates a situation where the light source of the display device 2 is turned off, and the part (b) illustrates a situation where the light source is turned on. An image based on uncorrected image data is displayed in the situation illustrated in the part (b) of FIG. 2.

Figure 3:
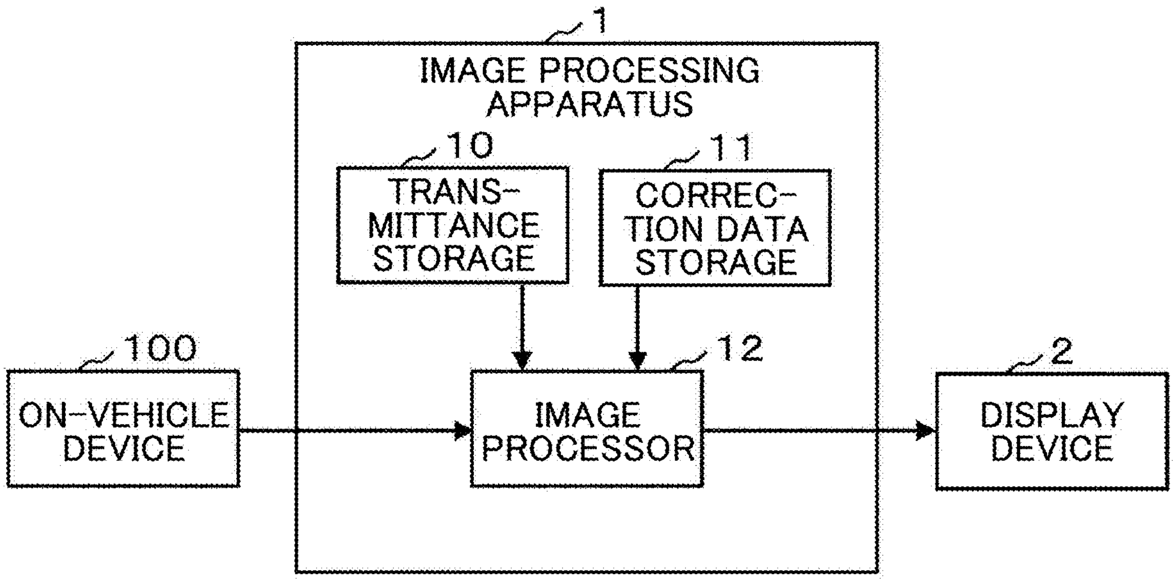
FIG. 3 is a block diagram illustrating a functional configuration example of an image processing apparatus according to the present embodiment.

FIG. 3 is a block diagram illustrating an example of a functional configuration of the image processing apparatus 1. As illustrated in FIG. 3, the image processing apparatus 1 includes a transmittance storage 10, a correction data storage 11, and an image processor 12. The image processor 12 performs the following processing by cooperation of hardware and software. For example, the processing of the image processor 12 is performed by the operation of a program stored in a storage medium, such as a random-access memory (RAM), a read-only memory (ROM), a hard disk, or a semiconductor memory, under the control of a microcomputer including a central processing unit (CPU), a RAM, a ROM, or the like. In addition to the microcomputer, a DSP (digital signal processor), a GPU (graphics processing unit), or the like may be provided.

The transmittance storage 10 stores data indicating a transmittance of each patterned area of the instrument panel 3. The transmittance of the instrument panel 3 is measured in advance, and the measured value is stored in the transmittance storage 10. The transmittance is indicated in a range of 0 to 100%. 0% means that no light is transmitted, and 100% means that light is completely transmitted. The transmittance of each patterned area stored in the transmittance storage 10 is the transmittance of an area of the entire surface of the instrument panel 3 that faces the display surface of the display device 2. The transmittance of each patterned area is stored in association with a pixel position of the display surface.

The correction data storage 11 stores correction data generated in advance, for example, when the display system is manufactured or mounted on a vehicle. The correction data is generated by gradation-inverting data of a luminance distribution that appears on the instrument panel 3 when the entire display surface is displayed in a uniform color under a condition where the ambient illuminance of the instrument panel 3 is controlled to be a predetermined state.

Figure 4:
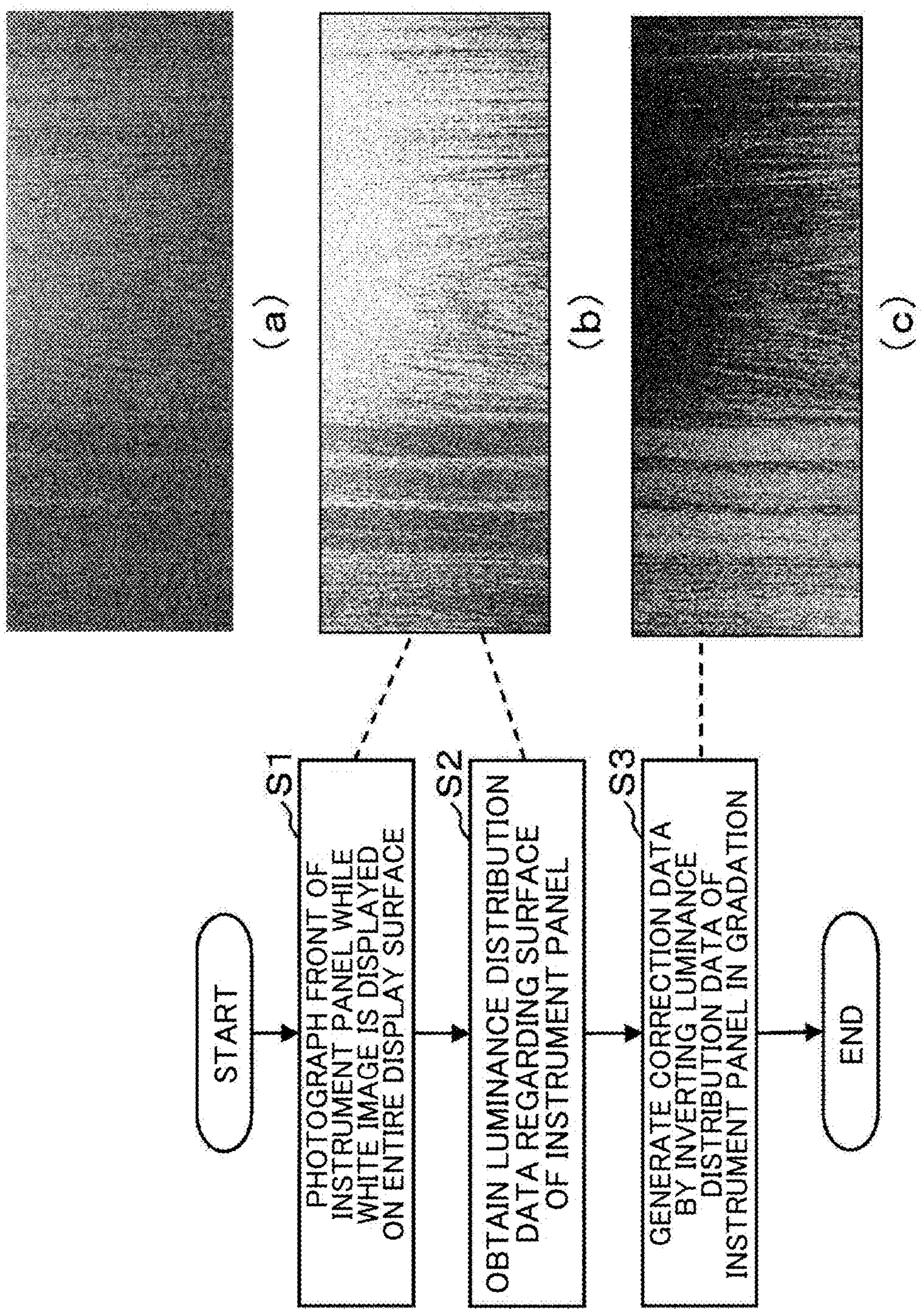
FIG. 4 is a diagram for explaining a method of generating correction data according to the present embodiment.

FIG. 4 is a diagram for explaining a method of generating the correction data. The correction data is generated by, for example, an image analyzing apparatus (not illustrated). The part (a) of FIG. 4 illustrates the instrument panel 3 viewed from its front in a situation where the light source of the display device 2 is off. As described above, when the light source is off, the image displayed by the display device 2 cannot be seen on the instrument panel 3, and the entire instrument panel 3 appears uniformly with a pattern, such as a wood-grain pattern.

First, the instrument panel 3 is photographed by a camera from the front of the instrument panel 3 in a situation where the entire display surface of the display device 2 is uniformly displayed in white, with an ambient illuminance of the instrument panel 3 being controlled to be a predetermined state as illustrated in the part (a) of FIG. 4 (step S1). The state in which the ambient illuminance of the instrument panel 3 is controlled to be a predetermined state means, for example, a state in which the surface of the instrument panel 3 is uniformly irradiated with external light at a predetermined illuminance in a dark room.

Under such a state in which the ambient illuminance is controlled, the display device 2 displays a solid white image (hereinafter referred to as a "white image") on the entire surface of the display surface. As a result, the display light of the white image is transmitted forward through the fine holes of the instrument panel 3, causing the white image and the pattern of the instrument panel 3 to appear overlapped when viewed from the front of the instrument panel 3. The instrument panel 3 in this state is photographed from its front with a camera.

Next, the image analyzing apparatus analyzes data of the photographed image of the instrument panel 3 to obtain luminance distribution data regarding the surface of the instrument panel 3 (step S2). The part (b) of FIG. 4 illustrates the obtained luminance distribution data, namely, the luminance distribution data regarding the surface of the instrument panel 3 obtained when the white image is displayed on the entire display surface under the state in which the ambient illuminance of the instrument panel 3 is controlled to be a predetermined state. The luminance distribution data obtained here corresponds to the luminance distribution data of an area of the entire surface of the instrument panel 3 that faces the entire surface of the display surface.

Next, the image analyzing apparatus generates correction data by gradation-inverting the luminance distribution data of the instrument panel 3 (step S3). The part (c) of FIG. 4 illustrates the correction data generated by gradation-inverting (negative-positive inversion) the luminance distribution data illustrated in the part (b) of FIG. 4. The gradation-inverted correction data is image data of a pattern having a luminance distribution in which the luminance distribution of the pattern of the instrument panel 3 that faces the display surface is gradation-inverted over the entire surface.

In the present embodiment, the correction data generated as described above is stored in the correction data storage 11. Since the pattern of the instrument panel 3 mounted on each vehicle differs from vehicle to vehicle, the correction data reflecting the pattern of the instrument panel 3 is generated for the display system mounted on each vehicle and stored in the correction data storage 11 of each vehicle. The above-described generation of correction data may be performed by the image processing apparatus 1.

The description will be made with reference back to FIG. 3. The image processor 12 corrects the image data to be displayed on the display surface of the display device 2 based on the correction data that is read from the correction data storage 11 within a luminance dynamic range determined based on the transmittance of the instrument panel 3 and the luminance of the image data (hereinafter referred to as an "image luminance"). A method of determining the luminance dynamic range will be described later in detail. In the example of FIG. 3, the image processor 12 corrects the original image data that is input from an on-vehicle device 100 based on the correction data stored in the correction data storage 11, and supplies the corrected image data (hereinafter referred to as "corrected image data") to the display device 2. For example, the image processor 12 performs a process of superimposing the correction data on the original image data, as the correction processing.

Figure 5:
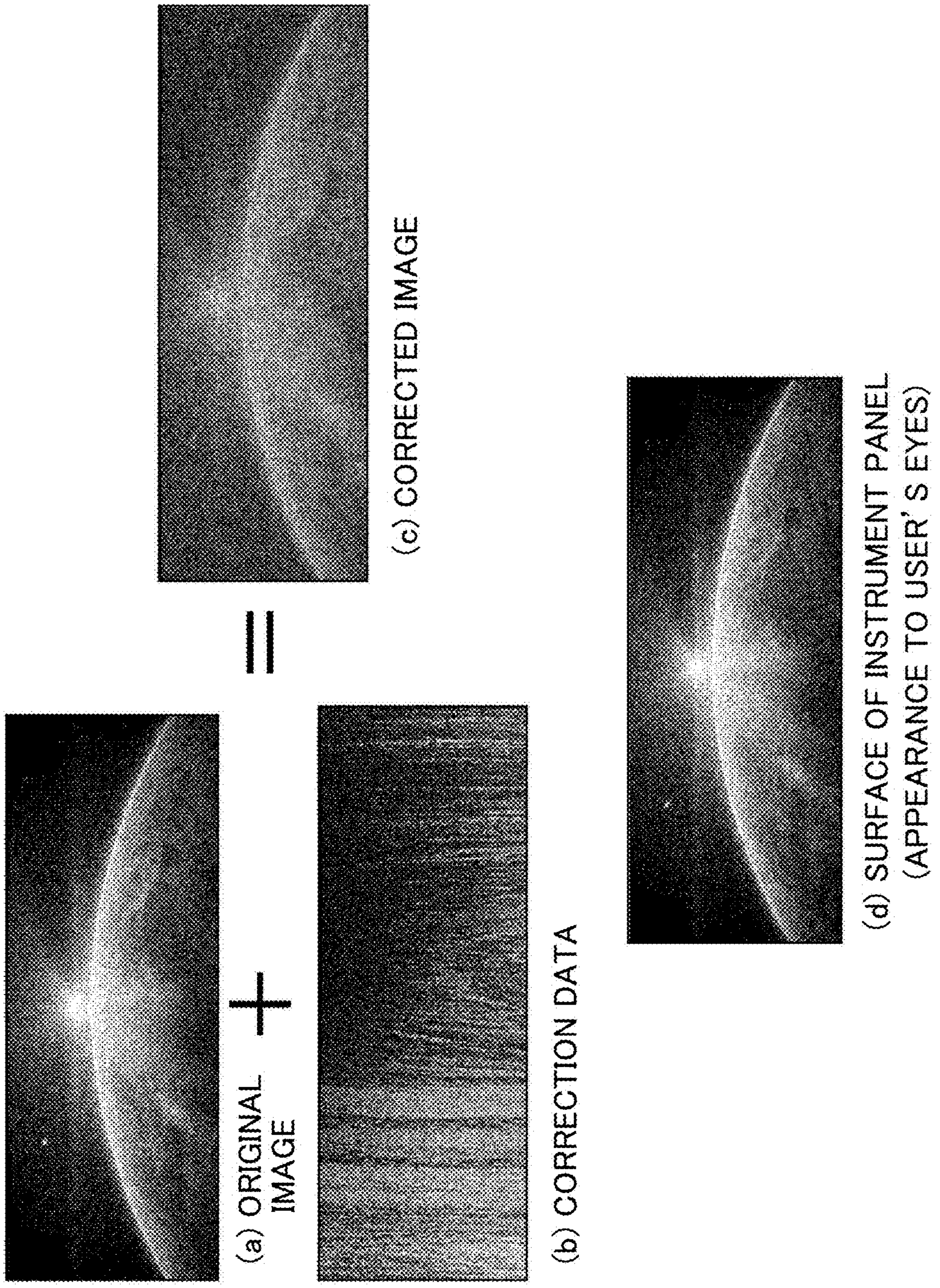
FIG. 5 is a diagram illustrating an example of correction processing by an image processor according to the present embodiment.

FIG. 5 is a diagram illustrating an example of the correction processing performed by the image processor 12. The part (a) of FIG. 5 illustrates the original image data that is input to the image processor 12, and the part (b) of FIG. 5 illustrates the correction data stored in the correction data storage 11. The image processor 12 performs a process of superimposing the correction data illustrated in the part (b) of FIG. 5 on the original image data illustrated in the part (a) of FIG. 5. The part (c) of FIG. 5 illustrates the corrected image data generated by this correction. The part (d) of FIG. 5 illustrates a state of the instrument panel 3 viewed from its front when a corrected image based on the corrected image data is displayed on the display surface of the display device 2.

The corrected image data illustrated in the part of (c) of FIG. 5 is image data in which correction equivalent to visually neutralizing the pattern of the instrument panel 3 is applied to the original image data illustrated in the part (a) of FIG. 5. For this reason, when a corrected image based on the corrected image data is displayed on the display surface, the pattern of the instrument panel 3 becomes less visible due to the component of the correction data included in the corrected image which can be seen through the fine holes of the instrument panel 3, and the original image becomes, on the other hand, easy to be seen without being disturbed by the pattern of the instrument panel 3 as illustrated in the part (d) of FIG. 5.

A method of determining the luminance dynamic range by the image processor 12 will now be described. The image processor 12 determines, as the luminance dynamic range, a maximum luminance range within which a luminance, which is caused to attenuate by display light from the display surface, which is based on the image data, passing through the instrument panel 3 and reduced according to a transmittance of the instrument panel 3 relative to the original image luminance, can be adjusted without exceeding the original image luminance by luminance adjustment.

Figure 6A:
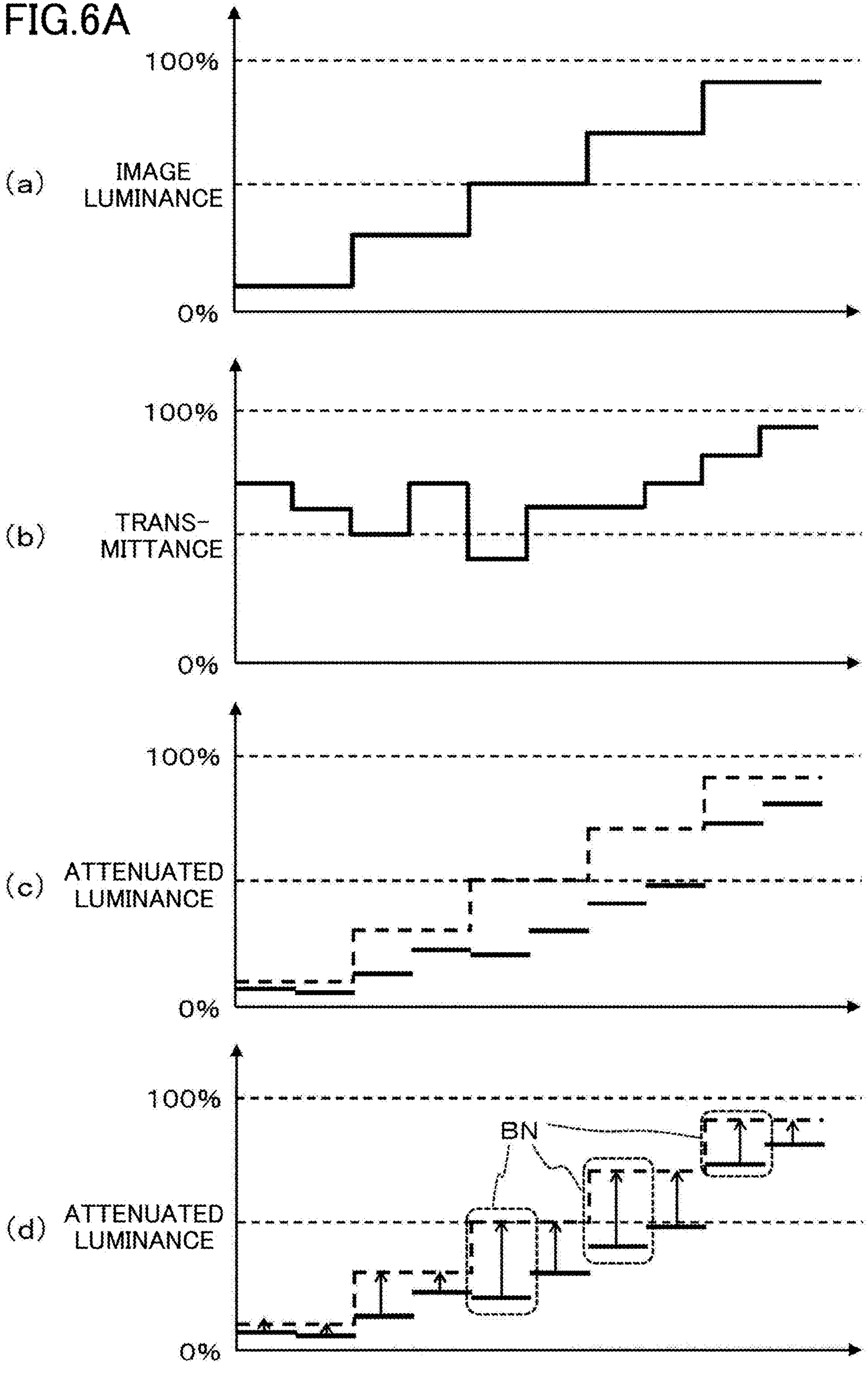
FIG. 6A illustrates graphs for explaining an example of a method of determining a luminance dynamic range by the image processor according to the present embodiment.

FIGS. 6A and 6B are graphs and diagrams for explaining an example of a method of determining the luminance dynamic range by the image processor 12. The calculation described below for determining the luminance dynamic range based on the transmittance of instrument panel 3 and the image luminance of the image data is executed on a per-predetermined-area basis. Herein, the transmittance of each patterned area of the instrument panel 3 is a fixed value, which is stored in advance in the transmittance storage 10 as described above. On the other hand, the image luminance of the image data to be displayed on the display device 2 is a variable value which changes for each area with time. Accordingly, for example, the calculation described below may be performed on a per-pixel basis with respect to the image data. Alternatively, the calculation described below may be performed using image areas, defined as predetermined areas, that face patterned areas each having its own uniform transmittance. In this case, for example, the maximum value among the image luminance values of a plurality of pixel positions included in an image area is used as the image luminance of a predetermined area to perform the calculation described below.

The graph (a) of FIG. 6A shows the image luminance based on the image data displayed on the display surface of the display device 2. The vertical axis represents the percentage of the luminance value (referred to as the "luminance level"), which is shown in the range of 0% to 100%.

When the luminance of the image data is represented by, for example, 255 gradations of 8 bits, 0% of the luminance level means that the luminance value is "0" (black), and 100% means that the luminance value is "255" (white). The horizontal axis represents the pixel positions in the image data (although the calculation may be performed using image areas, defined as predetermined areas, that face patterned areas having each uniform transmittance as described above, the pixel positions are used as the unit in this example), and the pixel positions along a single line are illustrated in this example. The part (a) of FIG. 6B shows the image luminance levels shown in the graph (a) of FIG. 6A as numerical values. The image luminance is recognized by the image processor 12 by analyzing the image data.

The graph (b) of FIG. 6A shows the transmittance of each patterned area of the instrument panel 3 stored in the transmittance storage 10. The vertical axis represents the transmittance, which is shown in a range of 0% to 100%. The horizontal axis represents the pattern positions of a single line that face the pixel positions of the image data shown in the graph (a) of FIG. 6A. The part (b) of FIG. 6B shows the transmittance values shown in the part (b) of FIG. 6B as numerical values.

The graph (c) of FIG. 6A shows the attenuated luminance after attenuation caused by the display light from the display surface passing through the instrument panel 3, together with the original image luminance level. The solid line represents the attenuated luminance level, and the dotted line represents the original image luminance level. The attenuated luminance indicates a theoretical value of the luminance of an image visible from the front of the instrument panel 3 (hereinafter referred to as a "visible image") when the original image data not corrected by the correction data is displayed on the display surface of the display device 2 as it is. In other words, the attenuated luminance level shown in the graph (c) of FIG. 6A is a value obtained by multiplying the image luminance level shown in the graph (a) of FIG. 6A by the transmittance shown in the graph (b) of FIG. 6A for each pixel position. The part (c) of FIG. 6B shows the attenuated luminance level shown in the graph (c) of FIG. 6A as a numerical value.

When the original image data is corrected based on the correction data, it is ideal if the attenuated luminance is corrected to be the same as the original image luminance as indicated by the arrow in the graph (d) of FIG. 6A. Herein, as shown in the part (d) of FIG. 6B, the attenuated luminance level when the original image luminance level at each pixel position is increased to the maximum luminance level (100%) achievable by the display device 2 is calculated, and it is checked whether the original image luminance can be reproduced with the increased attenuated luminance (in other words, whether the attenuated luminance level shown in the part (d) of FIG. 6B is equal to or greater than the original image luminance level shown in the part (a) of FIG. 6B).

The image processor 12 recognizes a pixel position at which the original image luminance cannot be reproduced as a bottleneck as indicated by "BN" in the part (e) of FIG. 6B. The pixel position as a bottleneck is a predetermined area where the transmittance of the instrument panel 3 shown in the part (b) of FIG. 6B is lower than the original image luminance level shown in the part (a) of FIG. 6B. In the example of FIG. 6B, three pixel positions are indicated as bottlenecks. These three positions are indicated by dotted squares BN in the graph (d) of FIG. 6A. Due to the pixel position identified as a bottleneck, the correction data applied to the original image data is insufficient to accurately restore the original image luminance, resulting in failure of the correction process.

In this case, as shown in the part (f) of FIG. 6B, the image processor 12 calculates, for each of the three pixel positions, a determination percentage by multiplying the ratio of the maximum luminance level achievable by the display device 2 to the original image luminance level by the transmittance of the instrument panel 3 (=transmittance×100%/image luminance level), and determines the luminance dynamic range based on the minimum value among the calculated determination percentages. In the case of the examples shown in FIGS. 6A and 6B, the image processor 12 determines the luminance dynamic range for performing correction to be 80% as the maximum luminance range within which the image luminance is adjusted to a maximum luminance without exceeding the original image luminance.

FIG. 7 is a diagram showing another numerical calculation example related to the method of determining the luminance dynamic range. The part (a) of FIG. 7 shows the image luminance of each predetermined area based on image data as a luminance value of 255 gradations. For the sake of explanation, image luminance values of seven predetermined areas are shown. The part (b) of FIG. 7 shows the transmittance values of the instrument panel 3 in patterned areas that face the seven predetermined areas shown in the part (a) of FIG. 7.

The image luminance of each predetermined area shown in the part (a) of FIG. 7 may be the image luminance in units of pixels as described above, or the maximum value of the image luminance of a plurality of pixel positions included in image areas that face the patterned areas each having a uniform transmittance. For example, in the latter case, the luminance value "150" shown at the leftmost position in the part (a) of FIG. 7 means that it is the maximum value of the image luminance of a plurality of pixel positions included in an image area that faces a patterned area having a uniform transmittance of "80%" shown in the part (b) of FIG. 7. The part (c) of FIG. 7 shows the attenuated luminance after display light from the display surface based on the original image data is attenuated by passing through the instrument panel 3 (the luminance value of the visible image). This attenuated luminance is a value obtained by multiplying the image luminance shown in the part (a) of FIG. 7 by the transmittance shown in the part (b) of FIG. 7.

As shown by the arrow in the graph (d) of FIG. 6A, when the original image data is corrected based on the correction data, it is ideal if the attenuated luminance is corrected to be the same as the original image luminance. In the example shown in FIG. 7, as shown in the part (d), a gain (hereinafter referred to as an "original image reproduction gain") necessary for bringing the attenuated luminance to the original image luminance is calculated for each predetermined area. This original image reproduction gain is calculated as a ratio (=image luminance/attenuated luminance) of the image luminance shown in the part (a) of FIG. 7 to the attenuated luminance shown in the part (c) of FIG. 7. This is a value equivalent to a ratio (=100/transmittance) of the transmittance of 100% to the transmittance of each patterned area.

If the original image reproduction gain is applied to the original image data when the original image data is corrected based on the correction data, the luminance of the visible image visible through the instrument panel 3 can reproduce the image luminance of the original image data. However, when the image luminance of the original image data is multiplied by the original image reproduction gain, the luminance may exceed the maximum luminance value "255" which is achievable by the display device 2 (the luminance level exceeds 100%).

The part (e) of FIG. 7 shows a value obtained by multiplying the image luminance shown in the part (a) of FIG. 7 by the original image reproduction gain shown in the part (d) of FIG. 7. As shown in the part (e) of FIG. 7, the luminance values in the fourth predetermined area from the left and the rightmost predetermined area exceed the maximum luminance "255" achievable by the display device 2, which indicates that these two predetermined areas are a bottleneck. The predetermined areas that are a bottleneck is an area where the transmittance of the instrument panel 3 shown in the part (b) of FIG. 7 is lower than a value obtained by converting the image luminance shown in the part (a) of FIG. 7 into a percentage level, which is similar to the example shown in FIG. 6B. In the example shown in FIG. 7, the luminance dynamic range is subsequently calculated using the value of the predetermined area where the multiplication result shown in the part (e) of FIG. 7 is the maximum among the two predetermined areas that are a bottleneck.

Herein, in the fourth predetermined area from the left where the multiplication result is the maximum, this means that the correction based on the correction data that applies the original image reproduction gain of "2.5" shown in the part (d) of FIG. 7 cannot be performed on the original image data. In other words, the combination of the image luminance shown in the part (a) of FIG. 7 and the transmittance shown in the part (b) of FIG. 7 becomes a bottleneck, and it is impossible to perform correction such that the original image reproduction gain of "2.5" is applied to the whole original image data.

The part (f) of FIG. 7 shows a gain suppression coefficient necessary for calculating a gain that can bring the image luminance to a maximum luminance without exceeding the original image luminance, within a range that does not exceed the maximum luminance achievable by the display device 2. This gain suppression coefficient is calculated as a ratio of the fourth maximum value from the left among the multiplication results shown in the part (e) of FIG. 7 to the maximum luminance achievable by the display device 2 (=300/255).

The part (g) of FIG. 7 shows an adjustment gain obtained by suppressing the original image reproduction gain shown in the part (d) of FIG. 7 by the gain suppression coefficient shown in the part (f) of FIG. 7. This adjustment gain is a gain that can bring the attenuated luminance to a maximum luminance to the original image luminance without exceeding the original image luminance, within a range that does not exceed the maximum luminance achievable by the display device 2, and is obtained by dividing the original image reproduction gain by the gain suppression coefficient. In the example shown in FIG. 7, the adjustment gain is "2.13" (=2.50/1.18). This means that it is possible to perform correction based on correction data in such a manner that an adjustment gain of "2.13" is applied to the original image data having an image luminance of "120".

The part (h) FIG. 7 shows a determination percentage obtained by multiplying the adjustment gain shown in the part (g) of FIG. 7 by the transmittance of the instrument panel 3 shown in the part (b) of FIG. 7. The image processor 12 determines, as the luminance dynamic range, the determination percentage that is calculated in the above-described manner for the predetermined area that constitutes the largest bottleneck. In the case of the example shown in FIG. 7, 85.0% is determined as the luminance dynamic range at the time of correction.

FIG. 7 shows an example in which the adjustment gain is calculated only for the predetermined area in which the multiplication result shown in the part (e) of FIG. 7 exceeds the maximum luminance that can be displayed on the display device 2 to the greatest extent among the predetermined areas that constitute a bottleneck, and the luminance dynamic range is determined based on the calculation result. For example, the adjustment gain may be calculated for all the predetermined areas that constitute a bottleneck, and the minimum value among the determination percentages each obtained by multiplying the adjustment gain of each predetermined area by the transmittance of each predetermined area may be determined as the luminance dynamic range.

In this case, the gain suppression coefficient shown in the part (f) of FIG. 7, the adjustment gain shown in the part (g) of FIG. 7, and the determination percentage shown in the part (h) of FIG. 7 are calculated for each of the two bottleneck areas in which the multiplication result shown in the part (e) of FIG. 7 exceeds "255". Then, the image processor 12 determines the minimum value among the determination percentages calculated for the predetermined areas identified as a bottleneck as the luminance dynamic range. Also in this case, 85.0% is determined as the luminance dynamic range at the time of correction.

It should be noted that there may be a case where the multiplication result shown in the part (e) of FIG. 7 does not exceed "255" in any of the predetermined areas and there is no predetermined area which becomes a bottleneck. In this case, the image processor 12 may determine "100%" as the luminance dynamic range at the time of correction. For example, if the maximum value of the multiplication result shown in the part (e) of FIG. 7 exceeds "255", the image processor 12 may calculate the determination percentage for the predetermined area and set the luminance dynamic range to the determination percentage, and if it does not exceed "255", the luminance dynamic range may be set to 100%.

In FIG. 7, an example of calculating the determination percentage by multiplying the adjustment gain by the transmittance of the instrument panel 3 has been described, but the present embodiment is not limited to this example. For example, as shown in FIG. 8, the calculation of the adjustment gain may be omitted, and the determination percentage may be calculated by dividing 1 by the gain suppression coefficient. Although the direct calculation of the adjustment gain is omitted, the present method is equivalent to the calculation method of calculating the determination percentage by the adjustment gain.

Although FIG. 7 illustrates an example of calculating the determination percentage of the luminance dynamic range by calculating the attenuated luminance, the original image reproduction gain, the gain suppression coefficient, and the adjustment gain, the determination percentage may be calculated by a more simplified calculation as shown in FIG. 9.

The parts (a) and (b) of FIG. 9 are the same as the parts (a) and (b) of FIG. 7. The part (g') of FIG. 9 shows the ratio of the maximum luminance achievable by the display device 2 to the image luminance (=255/image luminance). This ratio is equivalent to the adjustment gain shown in the part (g) of FIG. 7. However, in the example of FIG. 9, since the multiplication results shown in the part (e) of FIG. 7 are not calculated, the predetermined area that becomes a bottleneck is not known. Therefore, the adjustment gains are calculated for all the predetermined areas.

The part (h') of FIG. 9 illustrates the determination percentage obtained by multiplying the adjustment gain shown in the part (g') of FIG. 9 by the transmittance of the instrument panel 3 shown in the part (b) of FIG. 9. As described above, in the example of FIG. 9, since the predetermined area that becomes a bottleneck is not known, the determination percentage of the luminance dynamic range is calculated for all the predetermined areas. The image processor 12 determines the minimum value of the determination percentage calculated for each predetermined area as the luminance dynamic range. In the example shown in FIG. 9, 85.0% is determined as the luminance dynamic range at the time of correction.

In the example shown in FIG. 9, a predetermined area in which the value of the determination percentage shown in the part (h') of FIG. 9 is less than 100% is a bottleneck area. If no predetermined area being a bottleneck exists in the image data, all the values of the determination percentage calculated for all predetermined areas of the image data are 100% or more. Accordingly, the image processor 12 sets the luminance dynamic range to 100% when the minimum value of the calculated determination percentage is greater than 100%, and sets the luminance dynamic range to the minimum value when the minimum value of the determination percentage is 100% or less.

When the luminance dynamic range is determined by the calculation method shown in FIGS. 7 and 8, the determination percentage may be calculated for all predetermined areas without focusing on the predetermined area being a bottleneck, and the minimum value of the determination percentage may be determined as the luminance dynamic range. In this case, the image processor 12 sets the luminance dynamic range to 100% when the minimum value of the calculated determination percentage is greater than 100%, and sets the luminance dynamic range to the minimum value when the minimum value of the determination percentage is 100% or less.

For example, the image processor 12 may calculate the original image reproduction gain shown in the part (d) of FIG. 7, the gain suppression coefficient shown in the part (f) of FIG. 7, the adjustment gain shown in the part (g) of FIG. 7, and the determination percentage shown in the part (h) of FIG. 7 for each predetermined area, and determine the luminance dynamic range based on the minimum value of the determination percentage of each predetermined area. The image processor 12 may calculate the original image reproduction gain shown in the part (d) of FIG. 8, the gain suppression coefficient shown in the part (f) of FIG. 8, and the determination percentage shown in the part (h) of FIG. 8 for each predetermined area, and determine the luminance dynamic range based on the minimum value of the determination percentage of each predetermined area.

As described above in detail, in the present embodiment, data generated by gradation-inverting data of a luminance distribution that appears on the instrument panel 3 when the entire display surface of the display device 2 is displayed as a white image is used as the correction data, and the image data to be displayed on the display surface is corrected by the correction data.

According to the present embodiment configured as described above, an effect equivalent to visually neutralizing the pattern on the instrument panel 3 can be obtained by the image of the gradation-inverted pattern of the correction data. This makes it possible to reduce the problem of the display image on the display surface, visible through the fine holes of the instrument panel 3, appearing overlapped with the pattern of the instrument panel 3 and becoming difficult to see, thereby improving the quality of the visible image.

In the present embodiment, the image processor 12 determines, as a luminance dynamic range, the maximum luminance range in which the attenuated luminance, which is the luminance at which the image luminance of the image data is attenuated according to the transmittance of the instrument panel 3, is adjusted to a maximum luminance without exceeding the original image luminance by luminance adjustment, and corrects the image data by the correction data within the determined luminance dynamic range.

Thus, instead of performing the correction within the luminance dynamic range adjusted in accordance with the minimum value of the transmittance of each patterned area of the instrument panel 3, the luminance dynamic range in which the attenuation amount of luminance due to the transmission of the display light through the instrument panel 3 is minimized can be determined and the correction can be performed within the range, so that the reduction of luminance caused by the correction can also be suppressed. For example, in the case of the example shown in FIG. 7, since the luminance dynamic range is determined to be "85%" and correction is performed, the luminance dynamic range is improved by 45% as compared with the case where the minimum transmittance "40%" shown in the part (b) of FIG. 7 is used as the luminance dynamic range.

As shown in FIG. 10A, the value of the calculated determination percentage becomes small in an area where the image luminance is large and the transmittance of the instrument panel 3 is low. This is clearly understood by comparing FIG. 7 and FIG. 10A. In the example shown in FIG. 7, in the fourth predetermined area from the left, the image luminance is "120", the transmittance of the instrument panel 3 is 40%, and the value of the calculated determination percentage is 85%. On the other hand, in the example shown in FIG. 10A, in the fourth predetermined area from the left, the image luminance is "210", the transmittance of the instrument panel 3 is 40%, and the value of the calculated determination percentage is 48.6%, which is considerably smaller than the case shown in FIG. 7. In this case, if the minimum value of the calculated determination percentage is directly determined as the luminance dynamic range, the luminance of the visible image decreases due to correction based on the correction data.

For this reason, when the determination percentage calculated as shown in FIG. 10A (or the minimum value of the determination percentage calculated as shown in FIG. 9) is 100% or less and less than the threshold value, the image processor 12 may determine the luminance dynamic range to be a value greater than (the minimum value of) the determination percentage. The threshold value can be freely set. For example, when the threshold value is set to 50%, in the example of FIG. 10A, the luminance dynamic range is determined to be a value greater than "48.6%" because the determination percentage "48.6%" calculated for the fourth predetermined area from the left is 100% or less and is less than the threshold value.

How much a value greater than the minimum value of the determination percentage is determined as the luminance dynamic range can also be freely designed. For example, a value greater than the threshold value and less than the second smallest determination percentage value ("92.7%" shown in FIG. 9) may be determined as the luminance dynamic range. As illustrated in FIG. 10B, the determination percentage calculated by setting the gain suppression coefficient to a value less than the calculated value of FIG. 10A may be determined as the luminance dynamic range. The determination percentage calculated by setting the adjustment gain to a value greater than the calculated value of FIG. 10A may be determined as the luminance dynamic range.

When adjusting the value of the gain suppression coefficient or the adjustment gain, for example, the gain suppression coefficient or the adjustment gain may be multiplied by an adjustment value corresponding to a ratio between the transmittance of the instrument panel 3 shown in the part (b) of FIG. 10B and the value obtained by converting the attenuated luminance to a percentage luminance level shown in the part (c) of FIG. 10B. When the attenuated luminance "84" shown in the part (c) of FIG. 10B is converted to a percentage luminance level, 33% (=84/255×100) is obtained. In this case, the gain suppression coefficient may be multiplied by 33/40, or the adjustment gain may be multiplied by 40/33. This is merely an example of adjustment and the present embodiment is not limited to this.

When the luminance dynamic range is determined to be greater than the minimum value of the determination percentage, the image processor 12 clips the luminance of the predetermined area determined to be such a large value and executes correction based on the correction data. In other words, since the luminance dynamic range calculated as the maximum luminance range in which the attenuated luminance is adjusted to a maximum luminance without exceeding the original image luminance is "48.6" shown in the part (h) of FIG. 10A, for example, the image processor 12 clips the luminance to the upper limit of the luminance dynamic range and performs correction.

In this case, the displayed image cannot be accurately reproduced in some predetermined areas, but a larger luminance can be secured. Therefore, when designing the image processing device 1 with priority given to ensuring the luminance of the display image, it is possible to determine the luminance dynamic range as shown in FIG. 10B.

In the above embodiment, the image processor 12 may repeatedly determine the luminance dynamic range over time while an image is being displayed on the display device 2, and determine the current luminance dynamic range by performing time-series statistical processing using the luminance dynamic range determined in the past. The time-series statistical processing may be, for example, a weighted average operation.

For example, in the case of displaying a moving image in which movement is intense, there is a possibility that variation in image luminance may become large. In this case, if the luminance dynamic range is determined only by the image data of the corresponding frame for each frame of the moving image, there is a possibility that variation in luminance of the displayed image may become large. On the other hand, transient variation in luminance of the displayed image can be suppressed by storing the luminance dynamic range determined in the past several frames in a memory, and determining a value obtained by performing a weighted average operation by using the luminance dynamic range determined in the past and the luminance dynamic range calculated from the image data of the current frame as the luminance dynamic range.

In the above embodiment, an example has been described, in which an image of a uniform color to be displayed on the entire display surface of the display device 2 is a white image, but the display color is not limited to white. For example, it may be gray, or it may be the same color as the color of the instrument panel 3.

In the above embodiment, an example in which the display system of the present embodiment is applied to a vehicle has been described, but the present invention is not limited to this example. For example, it is not limited to a type of display system in which the display device 2 is incorporated and fixed in a dashboard or the like, but it may also be applied to a portable type display system in which the image processing apparatus 1, the display device 2, and the covering surface are configured to be portable.

The numerical calculation described above is an example, and is not limited to this example. Each function or each process described above can be appropriately combined and applied. Examples of configurations applicable to the present disclosure are summarized below.

[Clause 1]

A display system, including:

a patterned covering surface having a plurality of holes;

a display device having a display surface covered by the covering surface; and an image processing apparatus configured to process image data to be displayed on the display device, wherein the image processing apparatus includes a correction data storage configured to store correction data generated by gradation-inverting data of a luminance distribution that appears on the covering surface when an entirety of the display surface of the display device is displayed in a uniform color; and an image processor configured to correct the image data to be displayed on the display surface based on the correction data that is read from the correction data storage within a luminance dynamic range that is determined based on a transmittance of the covering surface and an image luminance of the image data, the image luminance being a luminance of the image data, and the image processor is configured to determine, as the luminance dynamic range, a maximum luminance range in which an attenuated luminance is adjusted to a maximum luminance by luminance adjustment without exceeding an original image luminance, the attenuated luminance being a luminance attenuated from the image luminance according to the transmittance by transmission of display light from the display surface based on the image data through the covering surface.

[Clause 2]

The display system according to Clause 1, wherein the image processor is configured to calculate, for one or more predetermined areas in which the transmittance of the covering surface is lower than a percentage level of the image luminance, determination percentages by multiplying a ratio of a maximum luminance achievable by the display device to the image luminance of the image data by the transmittance, and determine the luminance dynamic range based on a minimum value among the determination percentages calculated for the one or more predetermined areas.

[Clause 3]

The display system according to Clause 1, wherein the image processor is configured to calculate an original image reproduction gain that is a ratio of the image luminance to the attenuated luminance for each predetermined area;

calculate, for a predetermined area where a value obtained by multiplying the image luminance by the original image reproduction gain becomes a maximum value, a gain suppression coefficient that is a ratio of the maximum value to the maximum luminance achievable by the display device; and determine the luminance dynamic range based on a determination percentage obtained by multiplying an adjustment gain, which is obtained by dividing the original image reproduction gain by the gain suppression coefficient, by the transmittance of the covering surface corresponding to the predetermined area where the maximum value is obtained.

[Clause 4]

The display system according to Clause 3, wherein the image processor is configured to set the luminance dynamic range to 100% when the maximum value of the value obtained by multiplying the image luminance by the original image reproduction gain is equal to or less than the maximum luminance achievable by the display device; and calculate the determination percentage when the maximum value is greater than the maximum luminance and set the calculated determination percentage as the luminance dynamic range.

[Clause 5]

The display system according to Clause 4, wherein the image processor is configured to determine the luminance dynamic range to be greater than the determination percentage when the determination percentage is equal to or less than 100% and less than a threshold value, and correct a luminance of the predetermined area for which the luminance dynamic range to be greater than the determination percentage by clipping the luminance.

[Clause 6]

The display system of Clause 1, wherein the image processor is configured to calculate an original image reproduction gain, which is a ratio of the image luminance to the attenuated luminance, for each predetermined area;

calculate a gain suppression coefficient that is a ratio of a value, which is obtained by multiplying the image luminance by the original image reproduction gain to a maximum luminance achievable, by the display device, for each predetermined area; and determine the luminance dynamic range based on a minimum value among determination percentages each obtained by multiplying an adjustment gain by the transmittance of the covering surface corresponding to each predetermined area, the adjustment gain being obtained by dividing the original image reproduction gain by the gain suppression coefficient.

[Clause 7]

The display system according to Clause 1, wherein the image processor is configured to calculate a ratio of the maximum luminance achievable by the display device to the image luminance for each predetermined area; and determine the luminance dynamic range based on a minimum value among determination percentages each obtained by multiplying the calculated ratio by the transmittance of the covering surface corresponding to each predetermined area.

[Clause 8]

The display system according to Clause 6 or 7, wherein the image processor is configured to set the luminance dynamic range to 100% when the minimum value among the determination percentages is greater than 100%, and set the luminance dynamic range to the minimum value among the determination percentages when the minimum value is equal to or less than 100%.

[Clause 9]

The display system according to Cluse 8, wherein the image processor is configured to determine the luminance dynamic range to be greater than the minimum value when the minimum value is equal to or less than 100% and less than a threshold value, and correct a luminance of the predetermined area for which the luminance dynamic range is determined to be greater than the minimum value by clipping the luminance.

[Clause 10]

The display system according to any one of Clauses 1 to 9, wherein the image processor is configured to repeatedly perform determination of the luminance dynamic range over time, and determine a current luminance dynamic range by performing time-series statistical processing using the luminance dynamic range determined in advance.

[Clause 11]

An image processing apparatus, including:

a correction data storage configured to store correction data generated by gradation-inverting data of a luminance distribution that appears on a patterned covering surface having a plurality of holes that covers a display surface of a display device when an entirety of the display surface is displayed in a uniform color; and an image processor configured to store image data to be displayed on the display surface based on the correction data that is read from the correction data storage within a luminance dynamic range determined based on a transmittance of the covering surface and an image luminance which is the luminance of the image data to be displayed on the display device, wherein the image processor is configured to determine, as the luminance dynamic range, a maximum luminance range in which an attenuated luminance is adjusted to a maximum luminance by luminance adjustment without exceeding an original image luminance, the attenuated luminance being a luminance attenuated from the image luminance according to the transmittance by transmission of display light from the display surface based on the image data through the covering surface.

[Clause 12]

An image processing method, including:

in an image processing apparatus configured to process image data to be displayed on a display device having a display surface covered with a patterned covering surface having a plurality of holes, determining, by an image processor included in the image processing apparatus, as a luminance dynamic range, a maximum luminance range in which an attenuated luminance is adjusted to a maximum luminance by luminance adjustment without exceeding an original image luminance, the attenuated luminance being a luminance attenuated from the image luminance according to the transmittance by transmission of display light from the display surface based on the image data through the covering surface; and performing, by the image processor within the determined luminance dynamic range, image processing for correcting image data to be displayed on the display surface based on correction data generated by gradation-inverting data of a luminance distribution that appears on the covering surface when an entirety of the display surface of the display device is displayed in a uniform color.

The above embodiment is merely an example of embodiments for carrying out the present disclosure, and should not be construed as limiting the technical scope of the present disclosure. In other words, the present disclosure can be carried out in various forms without departing from the gist or main features thereof.

What is claimed is:

1. A display system, comprising:

a patterned covering surface having a plurality of holes;

a display device having a display surface covered by the covering surface; and an image processing apparatus configured to process image data to be displayed on the display device, wherein the image processing apparatus includes a correction data storage configured to store correction data generated by gradation-inverting data of a luminance distribution that appears on the covering surface when an entirety of the display surface of the display device is displayed in a uniform color; and an image processor configured to correct the image data to be displayed on the display surface based on the correction data that is read from the correction data storage within a luminance dynamic range that is determined based on a transmittance of the covering surface and an image luminance of the image data, the image luminance being a luminance of the image data, and the image processor is configured to determine, as the luminance dynamic range, a maximum luminance range in which an attenuated luminance is adjusted to a maximum luminance by luminance adjustment without exceeding an original image luminance, the attenuated luminance being a luminance attenuated from the image luminance according to the transmittance by transmission of display light from the display surface based on the image data through the covering surface.

2. The display system according to claim 1, wherein the image processor is further configured to calculate, for one or more predetermined areas in which the transmittance of the covering surface is lower than a percentage level of the image luminance, determination percentages by multiplying a ratio of a maximum luminance achievable by the display device to the image luminance of the image data by the transmittance, and determine the luminance dynamic range based on a minimum value among the determination percentages calculated for the one or more predetermined areas.

3. The display system according to claim 1, wherein the image processor is further configured to calculate an original image reproduction gain that is a ratio of the image luminance to the attenuated luminance for each predetermined area;

calculate, for a predetermined area where a value obtained by multiplying the image luminance by the original image reproduction gain becomes a maximum value, a gain suppression coefficient that is a ratio of the maximum value to the maximum luminance achievable by the display device; and determine the luminance dynamic range based on a determination percentage obtained by multiplying an adjustment gain, which is obtained by dividing the original image reproduction gain by the gain suppression coefficient, by the transmittance of the covering surface corresponding to the predetermined area where the maximum value is obtained.

4. The display system according to claim 3, wherein the image processor is further configured to set the luminance dynamic range to 100% when the maximum value of the value obtained by multiplying the image luminance by the original image reproduction gain is equal to or less than the maximum luminance achievable by the display device; and calculate the determination percentage when the maximum value is greater than the maximum luminance and set the calculated determination percentage as the luminance dynamic range.

5. The display system according to claim 4, wherein the image processor is further configured to determine the luminance dynamic range to be greater than the determination percentage when the determination percentage is equal to or less than 100% and less than a threshold value, and correct a luminance of the predetermined area for which the luminance dynamic range to be greater than the determination percentage by clipping the luminance.

6. The display system of claim 1, wherein the image processor is further configured to calculate an original image reproduction gain, which is a ratio of the image luminance to the attenuated luminance, for each predetermined area;

calculate a gain suppression coefficient that is a ratio of a value, which is obtained by multiplying the image luminance by the original image reproduction gain to a maximum luminance achievable, by the display device, for each predetermined area; and determine the luminance dynamic range based on a minimum value among determination percentages each obtained by multiplying an adjustment gain by the transmittance of the covering surface corresponding to each predetermined area, the adjustment gain being obtained by dividing the original image reproduction gain by the gain suppression coefficient.

7. The display system according to claim 6, wherein the image processor is further configured to set the luminance dynamic range to 100% when the minimum value among the determination percentages is greater than 100%, and set the luminance dynamic range to the minimum value among the determination percentages when the minimum value is equal to or less than 100%.

8. The display system according to claim 7, wherein the image processor is further configured to determine the luminance dynamic range to be greater than the minimum value when the minimum value is equal to or less than 100% and less than a threshold value, and correct a luminance of the predetermined area for which the luminance dynamic range is determined to be greater than the minimum value by clipping the luminance.

9. The display system according to claim 1, wherein the image processor is further configured to calculate a ratio of the maximum luminance achievable by the display device to the image luminance for each predetermined area; and determine the luminance dynamic range based on a minimum value among determination percentages each obtained by multiplying the calculated ratio by the transmittance of the covering surface corresponding to each predetermined area.

10. The display system according to claim 1, wherein the image processor is further configured to repeatedly perform determination of the luminance dynamic range over time, and determine a current luminance dynamic range by performing time-series statistical processing using the luminance dynamic range determined in advance.

11. An image processing apparatus, comprising:

a correction data storage configured to store correction data generated by gradation-inverting data of a luminance distribution that appears on a patterned covering surface having a plurality of holes that covers a display surface of a display device when an entirety of the display surface is displayed in a uniform color; and an image processor configured to store image data to be displayed on the display surface based on the correction data that is read from the correction data storage within a luminance dynamic range determined based on a transmittance of the covering surface and an image luminance which is the luminance of the image data to be displayed on the display device, wherein the image processor is configured to determine, as the luminance dynamic range, a maximum luminance range in which an attenuated luminance is adjusted to a maximum luminance by luminance adjustment without exceeding an original image luminance, the attenuated luminance being a luminance attenuated from the image luminance according to the transmittance by transmission of display light from the display surface based on the image data through the covering surface.

12. An image processing method, comprising:

in an image processing apparatus configured to process image data to be displayed on a display device having a display surface covered with a patterned covering surface having a plurality of holes, determining, by an image processor included in the image processing apparatus, as a luminance dynamic range, a maximum luminance range in which an attenuated luminance is adjusted to a maximum luminance by luminance adjustment without exceeding an original image luminance, the attenuated luminance being a luminance attenuated from the image luminance according to the transmittance by transmission of display light from the display surface based on the image data through the covering surface; and performing, by the image processor, within the determined luminance dynamic range, image processing for correcting image data to be displayed on the display surface based on correction data generated by gradation-inverting data of a luminance distribution that appears on the covering surface when an entirety of the display surface of the display device is displayed in a uniform color.

* * * * *